(12) United States Patent
Fukui et al.

(10) Patent No.: US 11,515,051 B2
(45) Date of Patent: Nov. 29, 2022

(54) NUCLEAR POWER PLANT

(71) Applicant: Hitachi-GE Nuclear Energy, Ltd., Hitachi (JP)

(72) Inventors: Sohei Fukui, Tokyo (JP); Takahisa Matsuzaki, Tokyo (JP); Kazuaki Kito, Tokyo (JP); Yoshihiko Ishii, Tokyo (JP); Masataka Hidaka, Tokyo (JP); Tomohiko Ikegawa, Tokyo (JP); Katsuki Hamada, Tokyo (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 721 days.

(21) Appl. No.: 16/479,989

(22) PCT Filed: Jan. 12, 2018

(86) PCT No.: PCT/JP2018/000564
§ 371 (c)(1),
(2) Date: Jul. 23, 2019

(87) PCT Pub. No.: WO2018/139208
PCT Pub. Date: Aug. 2, 2018

(65) Prior Publication Data
US 2019/0371481 A1 Dec. 5, 2019

(30) Foreign Application Priority Data

Jan. 24, 2017 (JP) .............................. JP2017-009920

(51) Int. Cl.
*G21C 9/008* (2006.01)
*B01D 53/22* (2006.01)
(Continued)

(52) U.S. Cl.
CPC ............. *G21C 9/008* (2013.01); *B01D 53/22* (2013.01); *B01D 69/08* (2013.01); *B01D 71/02* (2013.01);
(Continued)

(58) Field of Classification Search
None
See application file for complete search history.

(56) References Cited

U.S. PATENT DOCUMENTS

2003/0222015 A1* 12/2003 Oyama ................ B01D 53/228
210/488
2007/0151447 A1* 7/2007 Merkel ................ B01D 53/228
95/52
(Continued)

FOREIGN PATENT DOCUMENTS

| JP | 2011-230037 A | 11/2011 |
| JP | 2013-540989 A | 11/2013 |

(Continued)

OTHER PUBLICATIONS

English language machine translation for JP 2016-125950. Retrieved from translationportal.epo.org on May 4, 2022. (Year: 2022).*

(Continued)

*Primary Examiner* — Jason M Greene
(74) *Attorney, Agent, or Firm* — Crowell & Moring LLP (57) ABSTRACT

In view of above problems, an object of the invention is to provide a primary containment vessel venting system having a structure capable of continuously discharging vapor in a primary containment vessel out of the system and continuously reducing pressure of the primary containment vessel without discharging radioactive noble gases to the outside of the containment vessel and without using an enclosing vessel or a power source. In order to achieve the above object, an nuclear power plant of the invention includes a (Continued)

primary containment vessel which includes a reactor pressure vessel, a radioactive substance separation apparatus which is disposed inside the primary containment vessel and through which the radioactive noble gases do not permeate but vapor permeates, a vent pipe which is connected to the radioactive substance separation apparatus, and an exhaust tower which is connected to the vent pipe and discharges a gas, from which a radioactive substance is removed, to the outside.

18 Claims, 8 Drawing Sheets

(51) Int. Cl.
  *B01D 69/08* (2006.01)
  *B01D 71/02* (2006.01)
  *B01D 71/64* (2006.01)
  *G21D 5/00* (2006.01)
  *G21F 9/02* (2006.01)

(52) U.S. Cl.
  CPC .......... *B01D 71/024* (2013.01); *B01D 71/64* (2013.01); *G21D 5/00* (2013.01); *G21F 9/02* (2013.01)

(56) References Cited

U.S. PATENT DOCUMENTS

| | | |
|---|---|---|
| 2009/0131244 A1 | 5/2009 | Bishop et al. |
| 2013/0032028 A1 | 2/2013 | Miyazawa et al. |
| 2013/0180399 A1* | 7/2013 | Chantereau ............... G21F 9/02 95/47 |
| 2013/0182812 A1* | 7/2013 | Eckardt .................... G21F 9/02 376/314 |
| 2014/0069277 A1* | 3/2014 | Choi ...................... B01D 71/02 427/244 |
| 2015/0243379 A1* | 8/2015 | Buhlmann ............. G21C 9/004 376/283 |
| 2016/0310908 A1 | 10/2016 | Yu |

FOREIGN PATENT DOCUMENTS

| | | | | |
|---|---|---|---|---|
| JP | 2014-20997 | * | 2/2014 | ............... G01C 9/00 |
| JP | 2014-20997 A | | 2/2014 | |
| JP | 2014-44118 A | | 3/2014 | |
| JP | 2015-27674 A | | 2/2015 | |
| JP | 2015-508502 A | | 3/2015 | |
| JP | 2015-522167 A | | 8/2015 | |
| JP | 2016-125950 | * | 7/2016 | ............... G01F 9/02 |
| JP | 2016-125950 A | | 7/2016 | |
| JP | 2017-500195 A | | 1/2017 | |

OTHER PUBLICATIONS

English language machine translation for JP 2014-20997. Retrieved from translationportal.epo.org on May 4, 2022. (Year: 2022).*
International Search Report (PCT/ISA/210) issued in PCT Application No. PCT/JP2018/000564 dated Apr. 24, 2018 with English translation (five (5) pages).
Japanese-language Written Opinion (PCT/ISA/237) issued in PCT Application No. PCT/JP2018/000564 dated Apr. 24, 2018 (seven (7) pages).

* cited by examiner

[Fig. 1]

① AEROSOL-LIKE RADIOACTIVE SUBSTANCE
② RADIOACTIVE NOBLE GASES
③ VAPOR
④ HYDROGEN
⑤ NITROGEN AND OTHER GASES

[Fig. 2]

① AEROSOL-LIKE RADIOACTIVE SUBSTANCE
② RADIOACTIVE NOBLE GASES
③ VAPOR
④ HYDROGEN
⑤ NITROGEN AND OTHER GASES

① AEROSOL-LIKE RADIOACTIVE SUBSTANCE
② RADIOACTIVE NOBLE GASES
③ VAPOR
④ HYDROGEN
⑤ NITROGEN AND OTHER

[Fig. 6]

① AEROSOL-LIKE RADIOACTIVE SUBSTANCE
② RADIOACTIVE NOBLE GASES
③ VAPOR
④ HYDROGEN
⑤ NITROGEN AND OTHER GASES

[Fig. 7]

① AEROSOL-LIKE RADIOACTIVE SUBSTANCE
② RADIOACTIVE NOBLE GASES
③ VAPOR
④ HYDROGEN
⑤ NITROGEN AND OTHER GASES

[Fig. 8]

① AEROSOL-LIKE RADIOACTIVE SUBSTANCE
② RADIOACTIVE NOBLE GASES
③ VAPOR
④ HYDROGEN
⑤ NITROGEN AND OTHER GASES

① AEROSOL-LIKE RADIOACTIVE SUBSTANCE
② RADIOACTIVE NOBLE GASES
③ VAPOR
④ HYDROGEN
⑤ OXYGEN
⑥ NITROGEN AND OTHER GASES

[Fig. 11]

① AEROSOL-LIKE RADIOACTIVE SUBSTANCE
② RADIOACTIVE NOBLE GASES
③ VAPOR
④ HYDROGEN
⑤ OXYGEN
⑥ NITROGEN AND OTHER GASES

[Fig. 12]

① AEROSOL-LIKE RADIOACTIVE SUBSTANCE
② RADIOACTIVE NOBLE GASES
③ VAPOR
④ HYDROGEN
⑤ OXYGEN
⑥ NITROGEN AND OTHER GASES

[Fig. 13]

NUCLEAR POWER PLANT

TECHNICAL FIELD

The present invention relates to a nuclear power plant that includes a primary containment vessel venting system.

BACKGROUND ART

A typical primary containment vessel venting system (hereinafter referred to as a filtered containment venting system) disclosed in PTL 1 includes, as a filtered containment venting system for removing a radioactive substance from a vent gas, a tank that contains water, a pipe that guides the vent gas into water in the tank, and a metal filter or an iodine filter provided at an outlet for discharging the vent gas from the tank. The vent gas is scrubbed by being discharged into the water in the tank to remove a particulate radioactive substance. In addition, a particulate radioactive substance that cannot be removed by scrubbing is further removed by the metal filter. A gaseous radioactive substance such as iodine is removed by a chemical reaction and adsorption in the iodine filter.

Further, PTL 2 also proposes a primary containment vessel venting system in which a pipe is connected to a primary containment vessel, a radioactive substance separation apparatus or a radioactive substance enclosing apparatus is provided outside the primary containment vessel, and radioactive noble gases with poor reactivity such as xenon or krypton are separated from a vent gas and are enclosed.

PRIOR ART LITERATURE

Patent Literature

PTL 1: JP-A-2014-44118
PTL 2: JP-T-2015-508502

SUMMARY OF INVENTION

Technical Problem

The primary containment vessel venting system for the purpose of removing the radioactive noble gases needs to include the radioactive substance separation apparatus and the radioactive substance enclosing apparatus as in PTL 2. Many enclosing vessels or a large enclosing vessel are required to separate all radioactive substances and enclose the separated radioactive substances according to elemental types or forms of the radioactive substances. Further, in a case where the radioactive substance separation apparatus is provided outside the primary containment vessel, even if vapor can permeate through the separation membrane accommodated inside the radioactive substance separation apparatus, a gas containing noble gases that cannot permeate is retained near the separation membrane, the above-mentioned permeation performance cannot be maintained, the vapor in the primary containment vessel cannot be continuously discharged out of the system, and pressure of the primary containment vessel cannot be continuously reduced. Therefore, in order to prevent impurities from being retained near the separation membrane, it is necessary to reserve a returning pipe to a containment vessel that constantly circulates a vented gas, an apparatus such as a pump for transporting a vent gas, and a power source for using an apparatus such as the pump.

In view of above problems, an object of the invention is to provide a primary containment vessel venting system having a structure capable of continuously discharging vapor inside the primary containment vessel out of the system and continuously reducing pressure of the primary containment vessel without discharging the radioactive noble gases to the outside of the containment vessel and without using an enclosing vessel or a power source.

Solution to Problem

In order to achieve the above object, a nuclear power plant of the invention includes a primary containment vessel which includes a reactor pressure vessel, a radioactive substance separation apparatus which is disposed inside the primary containment vessel and through which the radioactive noble gases do not permeate but vapor permeates, a vent pipe which is connected to the radioactive substance separation apparatus, and an exhaust tower which is connected to the vent pipe and discharges a gas, from which the radioactive substance is removed, to the outside.

Advantageous Effect

According to the invention, the primary containment vessel can be prevented from being pressurized without using an external power source and the radioactive substance can be prevented from leaking to the surrounding environment even in a case where there may be a situation in which a gas containing the radioactive substance flows out from the reactor pressure vessel into the primary containment vessel and the primary containment vessel is pressurized.

DESCRIPTION OF EMBODIMENTS

One function of a primary containment vessel provided in a nuclear power plant is to confine a radioactive substance inside the primary containment vessel and prevent the radioactive substance from leaking to the outside even if there is a situation (hereinafter referred to as a severe accident) such as a case where a reactor core disposed inside the reactor pressure vessel might be melted. Even in a case where a severe accident occurs, the accident is settled even if water is sufficiently injected thereafter, and the primary containment vessel is cooled. However, in a case where vapor continues to be generated and the primary containment vessel is not sufficiently cooled, the primary containment vessel may be pressurized. In a case where the primary containment vessel is pressurized, the gas in the primary containment vessel may be discharged into the atmosphere in a controlled state to depressurize the primary containment vessel. This operation is referred to as a vent operation. When this operation is performed, the radioactive substance is removed by pool water in a suppression pool to minimize public exposure in a boiling water reactor, and then the gas in the primary containment vessel (hereinafter referred to as a vent gas) is discharged into the atmosphere.

Although the radioactive substance is sufficiently removed by the pool water in the suppression pool as described above in the boiling water reactor and then the vent gas is discharged into the atmosphere, there may be a primary containment vessel venting system as a system for further removing the radioactive substance from the vent gas.

Embodiments of the primary containment vessel venting system according to the invention will be described below in detail.

First Embodiment

Figure 1:
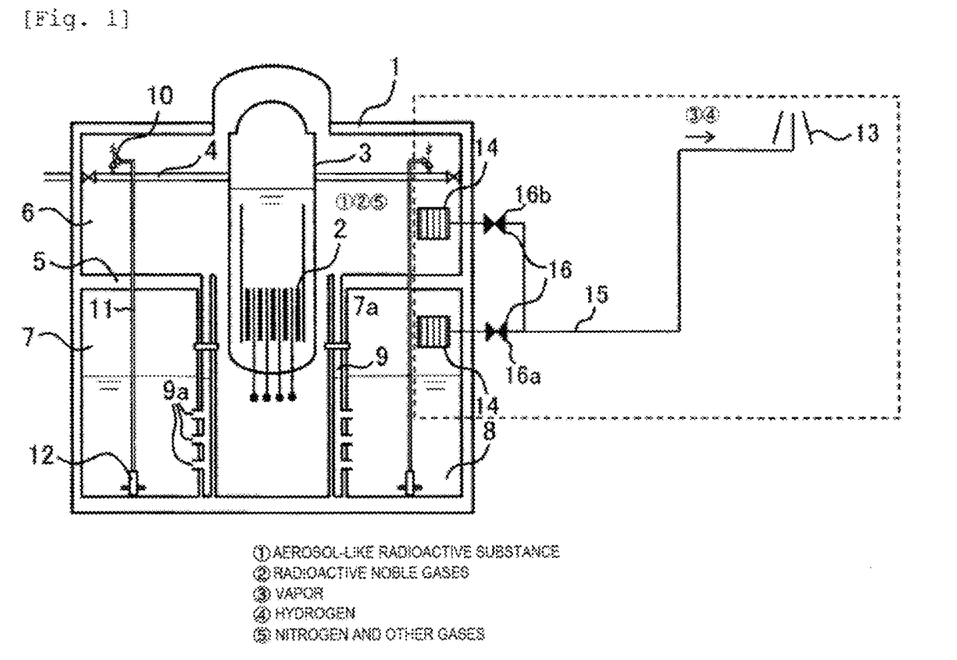
FIG. 1 is a configuration diagram of a primary containment vessel venting system according to a first embodiment.

A nuclear power plant provided with a primary containment vessel venting system according to a first embodiment, which is one of preferred embodiments in order to achieve the above object, will be described with reference to FIG. 1. FIG. 1 is a longitudinal sectional view showing a schematic configuration of a primary containment vessel and the primary containment vessel venting system according to the first embodiment. The primary containment vessel venting system according to the first embodiment is surrounded in a dashed box in FIG. 1.

The primary containment vessel venting system according to the first embodiment reduces pressure in the primary containment vessel and further removes a radioactive substance as much as possible during pressure reducing at the time of a severe accident such as breakage of the reactor pressure vessel.

The primary containment vessel venting system shown in FIG. 1 is an example applied to an improved boiling water reactor and includes a system configuration as follows. A reactor pressure vessel 3 that includes a reactor core 2 is provided in a primary containment vessel 1. A main vapor pipe 4 that sends vapor generated in the reactor pressure vessel 3 to a turbine (not shown) is connected to the reactor pressure vessel 3.

The inside of the primary containment vessel 1 is divided into a dry well 6 and a wet well 7 by a diaphragm floor 5 made of reinforced concrete. The wet well 7 refers to an area where pool water is stored therein. A pool in the wet well 7 is referred to as a suppression pool 8. The dry well 6 and the wet well 7 are in communication with each other by a vent pipe 9, and a discharging portion 9a of the vent pipe is opened under a surface of water in the suppression pool 8 in the wet well 7. In a case where there is a pipe breakage accident (generally known by the name of LOCA and occurs in the dry well 6 through which the pipe passes) in which a part of a pipe or the like is damaged and vapor is discharged into the primary containment vessel 1, pressure of the dry well 6 rises due to the vapor flowing out from a break opening. At that time, the vapor discharged into the dry well 6 is guided into the water in the suppression pool 8 in the wet well 7 through the vent pipe 9 due to a pressure difference between the dry well 6 and the wet well 7. The pressure rise in the primary containment vessel 1 is controlled by condensing the vapor with the water in the suppression pool 8. In this case, when radioactive substances are contained in the vapor, most of the radioactive substances are removed by a scrubbing effect of the water in the suppression pool 8.

As described above, in the case where there is a pipe breakage accident in the dry well 6, the vapor flowing out from the break opening is condensed in the suppression pool 8 through the vent pipe 9. Similarly, in a case where pressure of the reactor pressure vessel 3 or the main vapor pipe 4 increases, vapor is also discharged to the suppression pool 8 to lower the pressure of the reactor pressure vessel 3 or the main vapor pipe 4. At the same time, the discharged vapor is condensed in the suppression pool 8 to alleviate the pressure rise of the primary containment vessel 1. An ABWR as an apparatus for this purpose is provided with a vapor safety relief valve 10 in an area of the dry well 6 in the primary containment vessel 1. Vapor discharged through the vapor safety relief valve 10 is eventually discharged from a quencher 12 into the suppression pool 8 through a vapor safety relief valve exhaust pipe 11 and is condensed by the pool water in the suppression pool 8. By condensing the vapor in the suppression pool 8 into liquid water, a volume of the vapor is significantly reduced, and the pressure rise of the primary containment vessel 1 can be controlled. In addition, in a case where radioactive substances are contained in the vapor at this time, most of the radioactive substances are removed by the scrubbing effect of the water in the suppression pool 8.

By condensing the vapor in the suppression pool 8 and cooling the pool water in the suppression pool 8 by a residual heat removal system (not shown), a temperature rise and a pressure rise of the primary containment vessel 1 can be prevented and an accident can be settled. However, in a very unlikely occurring case where the residual heat removal system loses a function thereof, a temperature of the pool water in the suppression pool 8 rises. As the temperature of the pool water rises, partial pressure of the vapor in the primary containment vessel 1 rises up to saturated vapor pressure of the temperature of the pool water, so that pressure of the primary containment vessel 1 rises. When such a pressure rise occurs, the pressure rise can be controlled by spraying cooling water into the primary containment vessel 1. Further, the spraying can be operated by connecting a fire pump or the like from the outside. However, in a further very unlikely occurring case where the spraying does not work, pressure in the primary containment vessel 1 rises. When such a pressure rise of the primary containment vessel 1 occurs, the pressure rise of the primary containment vessel 1 can be controlled by discharging the gas in the primary containment vessel 1 to the outside. This operation is referred to as a vent operation. In the boiling water reactor, the vent operation is performed by discharging a gas in the wet well 7, so that the gas can be discharged to the outside after the radioactive substances are removed by the water in the suppression pool 8 to a maximum extent.

Most of the radioactive substances are removed by the above operation, and a discharged gas from which the radioactive substances are removed is discharged from an exhaust tower 13. However, since radioactive noble gases are poor in reactivity, the radioactive noble gases cannot be removed from the wet well 7 by the venting system. Therefore, a current vent operation needs to be performed after waiting until the radioactive noble gases decay, and thus cannot be performed in a relatively short period of time after a reactor scrum.

Therefore, the primary containment vessel venting system according to the first embodiment is provided with a radioactive substance separation apparatus 14 inside the primary containment vessel 1. The radioactive noble gases are confined in the radioactive substance separation apparatus 14, a separation membrane through which the vapor can permeate to the radioactive substance separation apparatus 14 is used, thus the vapor can be discharged to the outside, and the pressure of the primary containment vessel 1 can be lowered. A vent pipe 15 connected to the radioactive substance separation apparatus 14 is positioned in the dry well 6 and the wet well 7 of the primary containment vessel 1, and an isolation valve 16 is disposed in the vent pipe 15. The isolation valve 16 may be an air actuated valve, a rapture valve, or a manually operable valve that can be opened and closed without using a power source. The vent operation is usually performed by opening an isolation valve 16a at a wet well 7 side. The gas from the exhaust tower 13 is eventually discharged to the outside through the vent pipe 15. By opening an isolation valve 16b at a dry well 6 side, the radioactive substances can also be removed by the radioactive substance separation apparatus 14, and the vapor can also be discharged to the outside.

In addition, although the radioactive noble gases can be removed no matter whether the radioactive substance separation apparatus 14 is placed at a position outside the primary containment vessel 1 or on the vent pipe, a pump for returning the radioactive noble gases removed by the separation membrane of the radioactive substance separation apparatus 14 to the primary containment vessel 1 once again or an enclosing vessel for enclosing the radioactive noble gases is not required by placing the radioactive substance separation apparatus inside the primary containment vessel 1, so that the structure is simpler. Even in a further very unlikely occurring case where the vent pipe 15 connected to the primary containment vessel 1 is broken, since a gas flowing inside the vent pipe 15 is only a non-radioactive substance, exposure to an operator can be controlled to a level as low as possible. By placing the radioactive substance separation apparatus 14 inside the primary containment vessel 1 in this way, (1) an aerosol-like radioactive substance, (2) noble gases, and (5) nitrogen can remain inside the primary containment vessel 1, and only (3) vapor and (4) hydrogen can be discharged from the vent pipe 15 to the exhaust tower 13. In this way, by providing the radioactive substance separation apparatus which is disposed inside the primary containment vessel and through which the radioactive noble gases do not permeate but the vapor permeates, it is not necessary to use a pump to return the radioactive noble gases to the primary containment vessel 1 once again even in a case where the gas that contains the radioactive substance flows from the reactor pressure vessel to the primary containment vessel and the primary containment vessel is pressurized. Therefore, the primary containment vessel can be prevented from being pressurized without using an external power source, and the radioactive substance can be prevented from leaking to the surrounding environment.

Further, a structural material of the radioactive substance separation apparatus 14 is as follows. The radioactive substance separation apparatus 14 is required to be permeable by vapor, and preferably, can also permeable by hydrogen that may be generated in a case where the reactor core 2 is melted in order to prevent the primary containment vessel 1 from being pressurized. A molecular diameter of the vapor and the hydrogen that can be permeated is equal to or less than 0.3 nm, and the radioactive noble gases (mainly krypton or xenon) that cannot permeate are considerably larger than that. Therefore, it is conceivable to use a membrane that can be separated by a molecular sieve to selectively permeate the vapor or the hydrogen having a small molecular diameter. In a case of the boiling water reactor, although the gas in the primary containment vessel 1 is replaced with nitrogen, the nitrogen close to a molecular size of the krypton or the xenon is not permeated when the gas is selected by the molecular sieve using the molecular size. As a preferable separation membrane for such an application, it is desirable to use a membrane that can be separated by a molecular sieve such as a polymer membrane with polyimide as a main component, a ceramic membrane with silicon nitride as a main component, or a graphene oxide membrane with carbon as a main component. These separation membranes are generally used in a filter for hydrogen purification. In addition, if the membrane is other membranes through which the krypton or xenon does not permeate but hydrogen and vapor permeate, these membranes may also be used. For example, a separation membrane through which hydrogen, vapor, oxygen, and nitrogen permeates, such as a nitrogen separation membrane which is used for nitrogen purification and through which hydrogen, vapor and oxygen permeates but nitrogen does not permeate may also be used.

Figure 11:
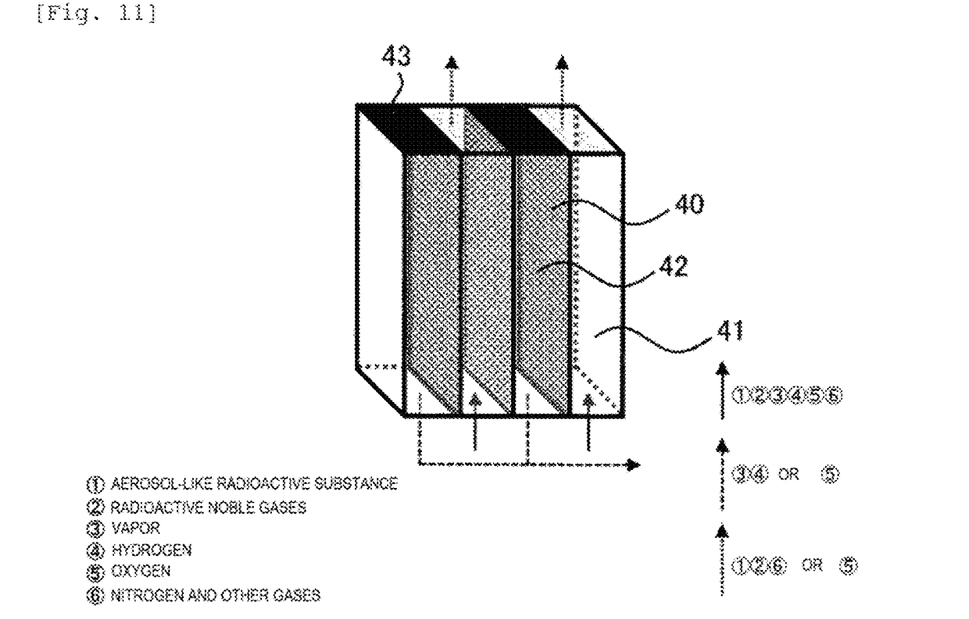
FIG. 11 is a schematic view of a radioactive substance separation apparatus according to the first embodiment.
Figure 12:
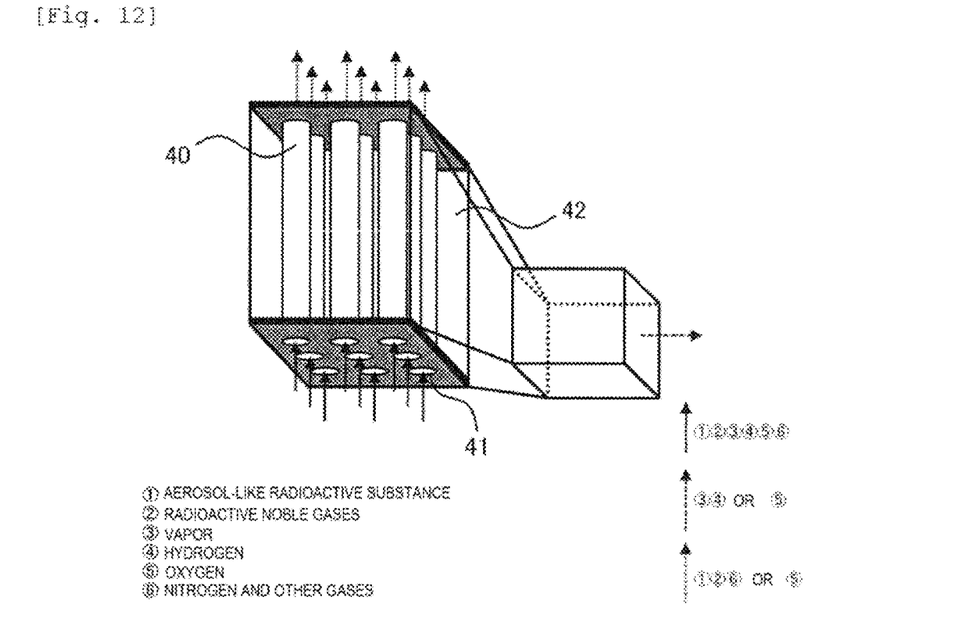
FIG. 12 is a schematic view of the radioactive substance separation apparatus according to the first embodiment.
Figure 13:
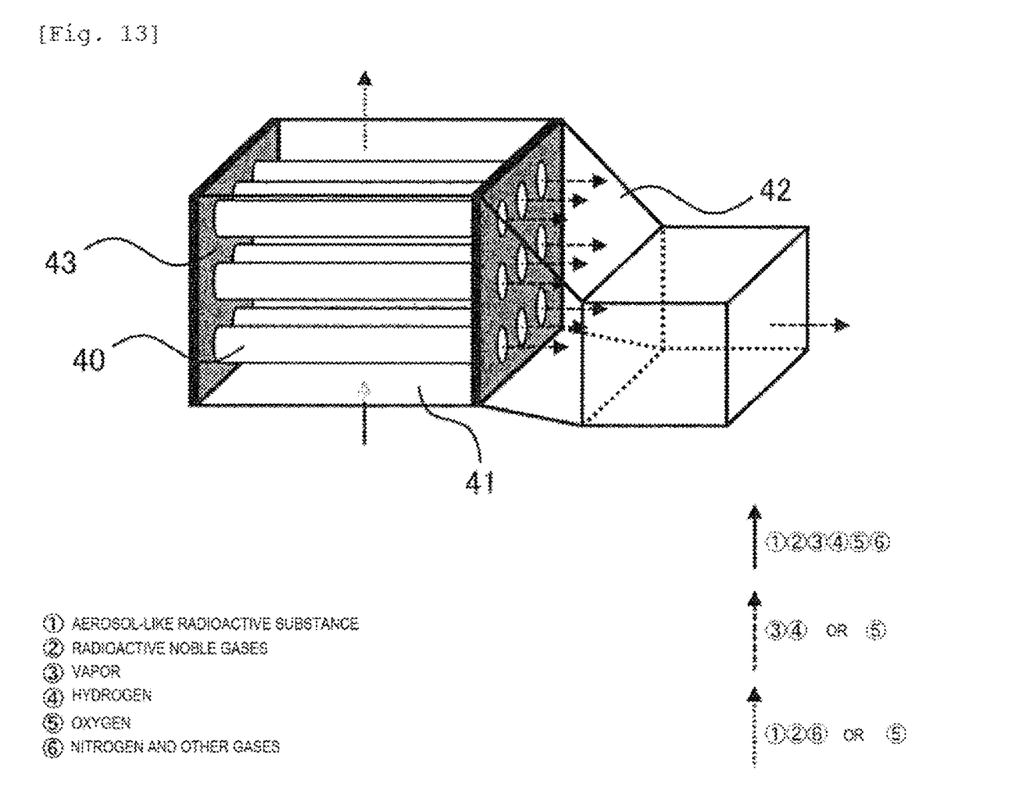
FIG. 13 is a schematic view of the radioactive substance separation apparatus according to the first embodiment.

FIGS. 11, 12, and 13 are schematic views showing a shape of the radioactive substance separation apparatus 14. The shape of a separation membrane 40 may be a plate shape as shown in FIG. 11, a tubular shape and a hollow fiber shape as shown in FIGS. 12 and 13. In a case of FIG. 11 (the plate shape), an internal space of the radioactive substance separation apparatus 14 is divided by the separation membrane 40 disposed parallel to a flow direction of fluid flowing inside, and fluid in the primary containment vessel 1 flows from a bottom of the radioactive substance separation apparatus 14 and flows to an upper portion. Further, a part of the space divided by the separation membrane 40 is closed by a closing plate 43. Therefore, among the fluid flowing from the bottom, (1) an aerosol-like radioactive substance, (2) radioactive noble gases, (6) nitrogen, or (5) oxygen cannot permeate the separation membrane 40, and thus is returned to the primary containment vessel 1 from an upper portion of a room that is not closed by the closing plate 43. Meanwhile, (3) vapor, (4) hydrogen or (5) oxygen permeates the separation membrane 40, enters into an adjacent room, and flows from the bottom to the vent pipe 15.

In a case of FIG. 12 (the tubular shape), an inner space of the radioactive substance separation apparatus 14 is divided by a tubular separation membrane 40 disposed parallel to a flow direction of fluid flowing inside, and fluid in the primary containment vessel 1 flows from the bottom of the tubular separation membrane 40 to an upper portion. Among the fluid flowing from the bottom, (1) an aerosol-like radioactive substance, (2) radioactive noble gases, (6) nitrogen, or (5) oxygen cannot permeate the separation membrane 40, and thus is returned from an upper portion of the separation membrane 40 to the primary containment vessel 1. Meanwhile, (3) vapor, (4) hydrogen or (5) oxygen permeates the separation membrane 40, is collected at one place, and flows to the vent pipe 15.

In a case of FIG. 13 (the hollow fiber shape), in an internal space of the radioactive substance separation apparatus 14, separation membrane 40 with a hollow fiber shape is disposed perpendicular with respect to a flow direction of fluid flowing inside, and fluid in the primary containment vessel 1 flows from the bottom of the radioactive substance separation apparatus 14 to an upper portion. Among the fluid flowing from the bottom, (1) an aerosol-like radioactive substance, (2) radioactive noble gases, (6) nitrogen, or (5) oxygen cannot permeate the separation membrane 40, and thus is returned from an upper portion of the radioactive substance separation apparatus 14 to the primary containment vessel 1. Meanwhile, (3) vapor, (4) hydrogen or (5) oxygen permeates the separation membrane 40, enters into the hollow fiber, is collected at one place, and flows to the vent pipe 15.

Regardless of these shapes, the separation membrane 40 is configured to completely divide an upstream space 41 and a downstream space 42, and an amount of the separation membrane 40 may be determined according to an amount of the discharged gas. The upstream space 41 is a space exposed to the gas in the primary containment vessel 1, and only vapor and hydrogen generated at the time of an accident can be discharged to the downstream space 42 via the separation membrane 40. Separation performance of the separation membrane 40 is not affected whether a gas in the upstream space 41 flows from the bottom to the upper portion as shown in FIGS. 11, 12, and 13 or flows from the upper portion to the bottom. The downstream space 42 is connected with the vent pipe 15, and is configured to discharge the discharged vapor or hydrogen. Since the separation membrane 40 is held by a reinforced plate, the possibility of breakage is extremely reduced, and a metal mesh sheet, a punching metal, a porous ceramic layer, or the like is effective as the reinforced plate (not shown).

Second Embodiment

Figure 2:
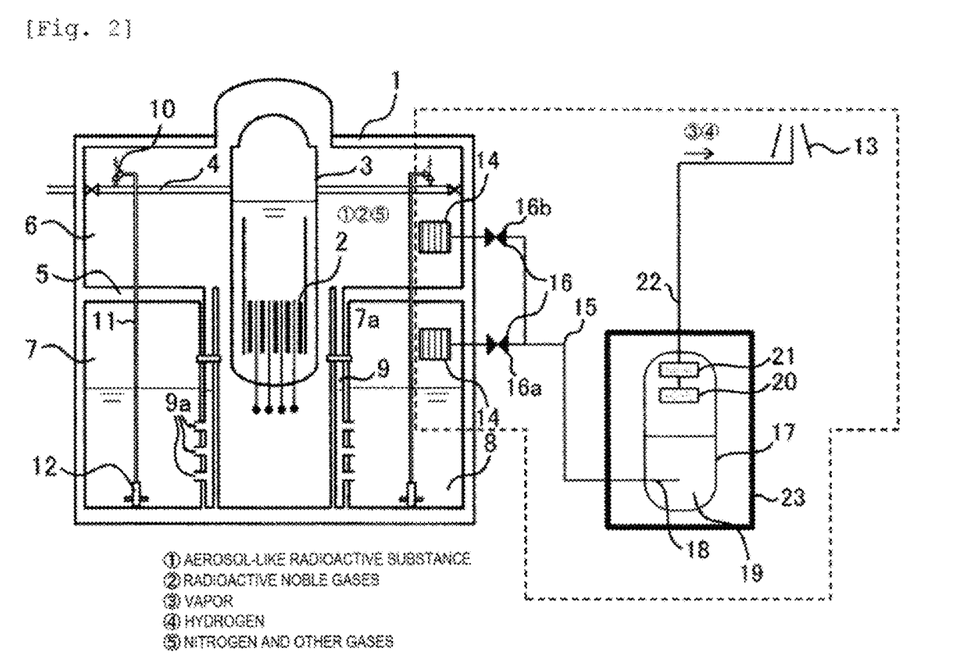
FIG. 2 is a configuration diagram of a primary containment vessel venting system according to a second embodiment.

A primary containment vessel venting system according to a second embodiment which is one of preferred embodiments to achieve the above object will be described with reference to FIG. 2. FIG. 2 is a longitudinal sectional view showing a schematic configuration of a primary containment vessel that includes a primary containment vessel and a primary containment vessel venting system according to the second embodiment. The primary containment vessel venting system according to the second embodiment is surrounded in a dashed box in FIG. 2. An arrangement configuration of the radioactive substance separation apparatus 14 in the second embodiment is also similar to that in the first embodiment, and only a difference from the first embodiment will be described here.

The second embodiment is an example that a general filtered containment venting system 17 is provided downstream of the radioactive substance separation apparatus 14 in a case where the separation membrane 40 inside the radioactive substance separation apparatus 14 is damaged. The vent pipe 15 is connected to the dry well 6 and the wet well 7 of the primary containment vessel 1, and the isolation valve 16 is disposed in the vent pipe 15. The vent pipe 15 is connected to an inlet pipe 18 of the filtered containment venting system 17. A front end side of the inlet pipe 18 is opened in the filtered containment venting system 17. Pool water 19 for scrubbing is stored at a lower side in the filtered containment venting system 17. A metal mesh metal filter 20 and an iodine filter 21 are disposed on an upper side of the filtered containment venting system 17. One end of an outlet pipe 22 of the filtered containment venting system 17 is connected to the iodine filter 21. The other end of the outlet pipe 22 penetrates a shield wall 23 and is led out to the outside of the shield wall 23. Finally, the gas is discharged from the exhaust tower 13 to the outside.

In a case where the separation membrane 40 inside the radioactive substance separation apparatus 14 is not damaged, the filtered containment venting system 17 is mainly used as a function of condensing the vapor discharged from the primary containment vessel 1 by the pool water 19 for scrubbing. In a case where the separation membrane 40 is damaged, the discharged gas that enters the filtered containment venting system 17 is scrubbed by the pool water 19 for scrubbing, so that most of the particulate radioactive substances are mainly removed. Further, the particulate radioactive substances that cannot be removed by scrubbing can be removed by the metal filter 20, and gaseous radioactive substances such as iodine can be removed by the iodine filter 21. Accordingly, a risk of discharging the radioactive substances into the environment can be reduced and reliability of the primary containment vessel venting system can be improved.

Third Embodiment

Figure 3:
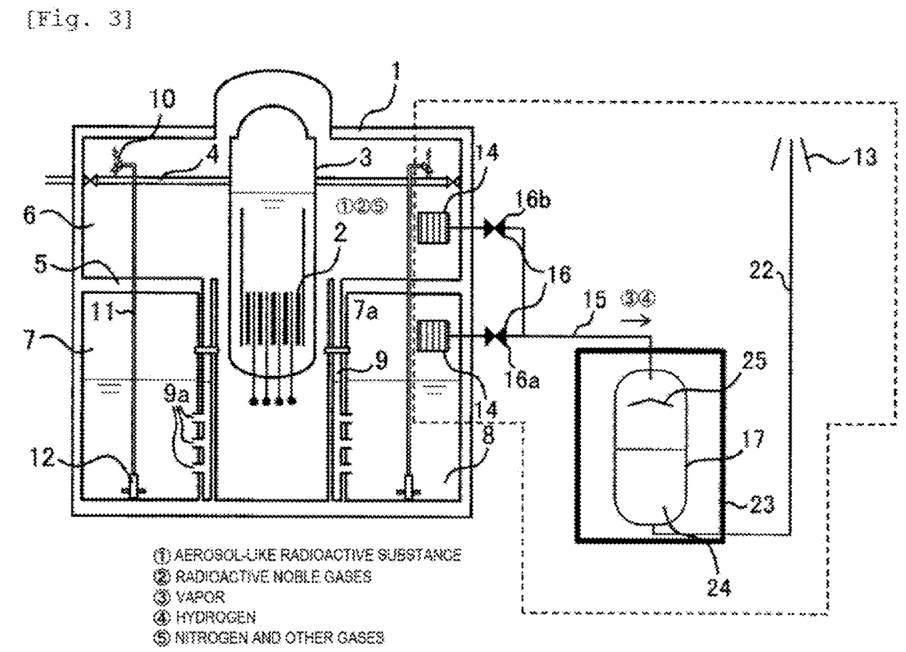
FIG. 3 is a configuration diagram of a primary containment vessel venting system according to a third embodiment.

A primary containment vessel venting system according to a third embodiment which is one of preferred embodiments to achieve the above object will be described with reference to FIG. 3. FIG. 3 is a longitudinal sectional view showing a schematic configuration of a primary containment vessel that includes a primary containment vessel and a primary containment vessel venting system according to the third embodiment. The primary containment vessel venting system according to the third embodiment is surrounded in a dashed box in FIG. 3. Only a configuration of the filtered containment venting system 17 in the third embodiment is modified from the second embodiment, and only a difference will be described.

The filtered containment venting system 17 is generally a wet or a dry filtered containment venting system, and the one in which the particle is removed by the pool water 19 for scrubbing in the vessel as in the second embodiment is a wet venting system. Meanwhile, the filtered containment venting system 17 in the third embodiment includes a baffle plate 25 at an upper portion, is paved with a sand filter 24 for removing the radioactive substances in the filtered containment venting system 17, and is a filtered containment venting system for removing the radioactive substances by the sand filter. This filtered containment venting system 17 is a dry venting system, and it is not necessary to manage water quality of the pool water 19 for scrubbing as compared to the wet venting system, but it is necessary to heat the system at the time of an accident. Since the radioactive noble gases cannot be removed even in the filtered containment venting system 17, the radioactive substance separation apparatus 14 of the invention is required, and the configuration thereof is similar to that in the second embodiment.

Fourth Embodiment

Figure 4:
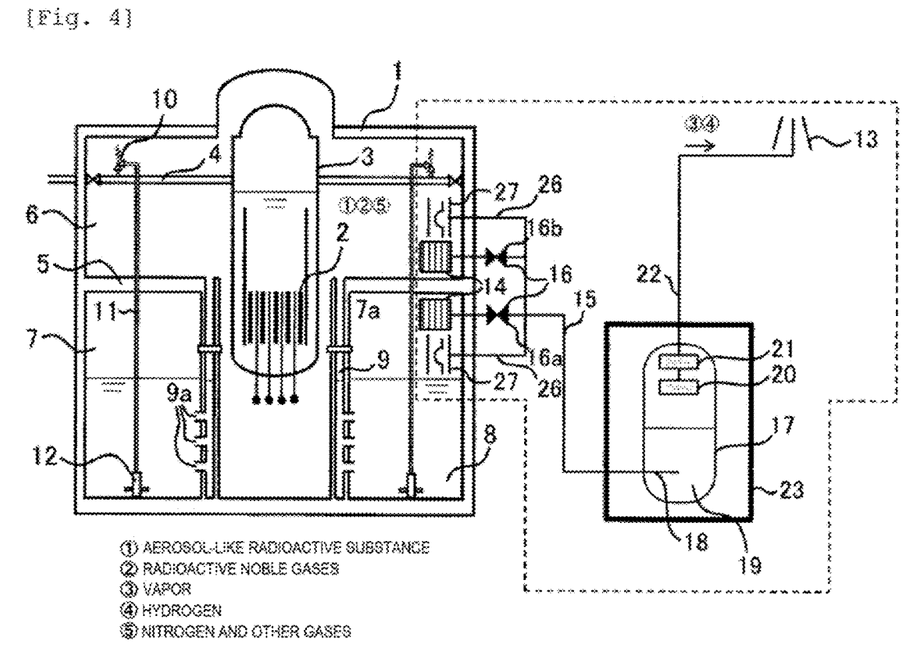
FIG. 4 is a configuration diagram of a primary containment vessel venting system according to a fourth embodiment.

A primary containment vessel venting system according to a third embodiment which is one of preferred embodiments to achieve the above object will be described with reference to FIG. 4. FIG. 4 is a longitudinal sectional view showing a schematic configuration of a primary containment vessel that includes a primary containment vessel and a primary containment vessel venting system according to the fourth embodiment. The primary containment vessel venting system according to the fourth embodiment is surrounded in a dashed box in FIG. 4. The fourth embodiment is also modified based on the second and the third embodiments, and only a difference will be described.

In the fourth embodiment, the radioactive substance separation apparatus 14 in the primary containment vessel filter venting system in the second and third embodiments is bypassed, and a bypass pipe 26 connected to a downstream portion of the radioactive substance separation apparatus 14 is provided. Further, a rupture disk 27 where a valve is opened when pressure exceeds a certain level and a division plate is broken, is provided at an upstream portion of the bypass pipe 26, and thus the primary containment vessel 1 can be depressurized by opening the rupture disk 27 in a case where the separation membrane 40 inside the radioactive substance separation apparatus 14 is clogged and the pressure of the primary containment vessel 1 rises. The rupture disk 27 may be a blast valve or other valves. In addition, this function may be replaced by configuring the radioactive substance separation apparatus 14 to a structure that breaks when pressure exceeds a certain level.

Fifth Embodiment

Figure 5:
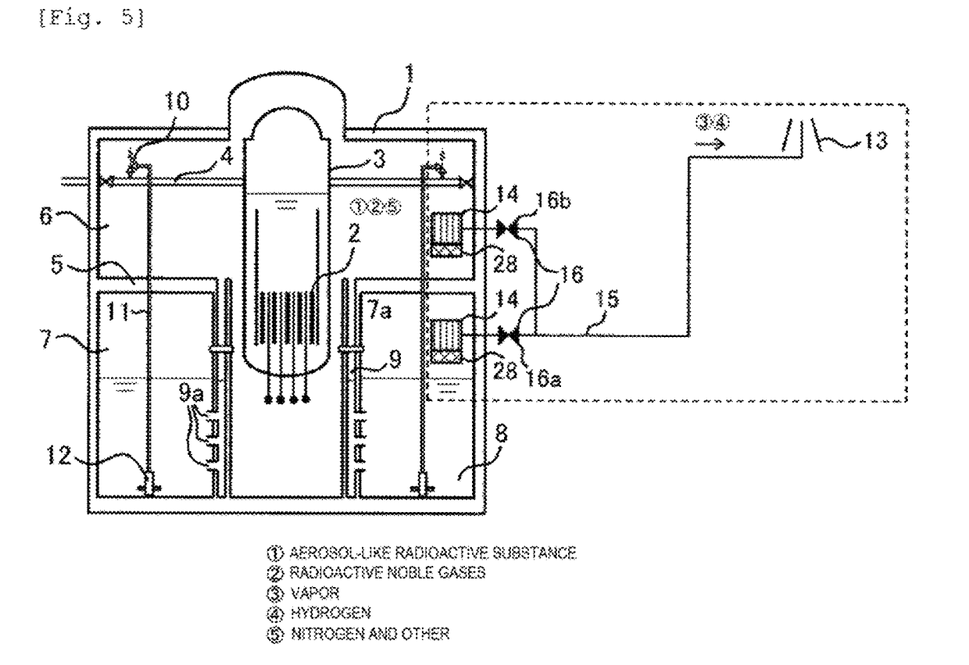
FIG. 5 is a configuration diagram of a primary containment vessel venting system according to a fifth embodiment.

A primary containment vessel venting system according to a fifth embodiment which is one of preferred embodiments to achieve the above object will be described with reference to FIG. 5. FIG. 5 is a longitudinal sectional view showing a schematic configuration of a primary containment vessel that includes a primary containment vessel and a primary containment vessel venting system according to the fifth embodiment. The primary containment vessel venting system according to the fifth embodiment is surrounded in a dashed box in FIG. 5. An arrangement configuration of the radioactive substance separation apparatus 14 in the fifth embodiment is also similar to that in the first embodiment, and only a difference from the first embodiment will be described here.

The gas in the primary containment vessel 1 contains particulate radioactive substances. A particle removal apparatus 28 is provided at an inlet portion of the radioactive substance separation apparatus 14 and is set to be a system that removes large particles as much as possible. With this mechanism, clogging caused by adsorbing of particles to the separation membrane 40 can be prevented, and deterioration of the separation membrane 40 caused by being exposed to strong radiation can be prevented. A fibrous metal filter, a hepa filter, an adsorbent, or the like is effective in the particle removal apparatus 28.

Sixth Embodiment

Figure 6:
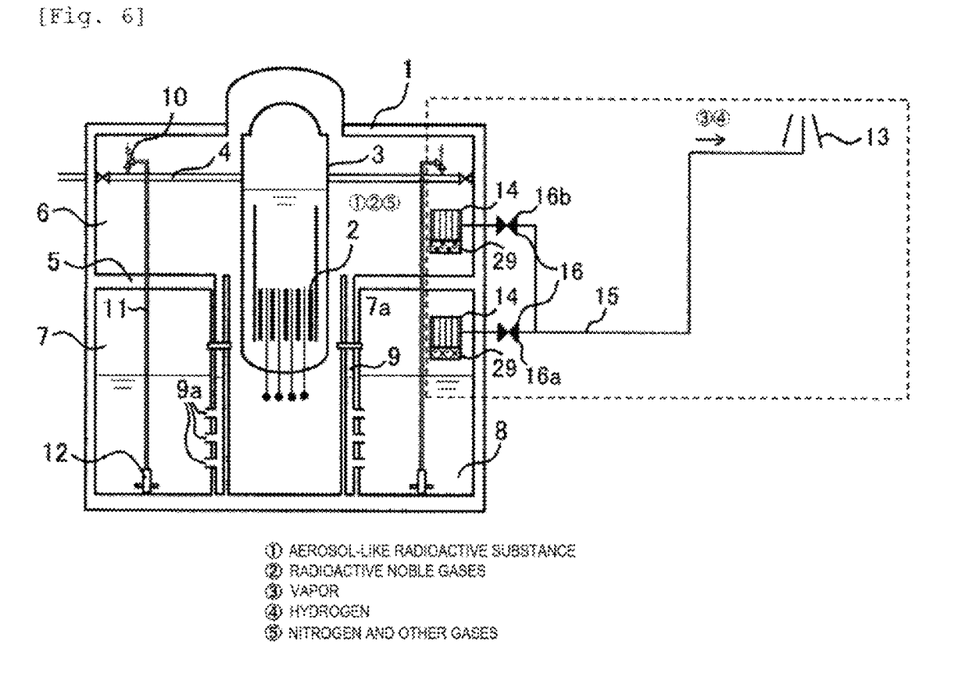
FIG. 6 is a configuration diagram of a primary containment vessel venting system according to a sixth embodiment.

A primary containment vessel venting system according to a sixth embodiment which is one of preferred embodiments to achieve the above object will be described with reference to FIG. 6. FIG. 6 is a longitudinal sectional view showing a schematic configuration of a primary containment vessel that includes a primary containment vessel and a primary containment vessel venting system according to the sixth embodiment. The primary containment vessel venting system according to the sixth embodiment is surrounded in a dashed box in FIG. 6. An arrangement configuration of the radioactive substance separation apparatus 14 in the sixth embodiment is also similar to that in the first embodiment, and only a difference from the first embodiment will be described here.

The gases in the primary containment vessel 1 contain gaseous iodine. An iodine removal apparatus 29 is provided at the inlet portion of the radioactive substance separation apparatus 14 and is set to be a system that removes the gaseous iodine as much as possible. With this mechanism, deterioration of the separation membrane 40 caused by physical adsorbing and chemical adsorbing of the highly reactive gaseous iodine to the separation membrane 40 can be prevented. Zeolite impregnated with silver, silver silica gel, silver alumina, $KI_3$ impregnated carbon, or the like is effective in the iodine removal apparatus 29.

Seventh Embodiment

Figure 7:
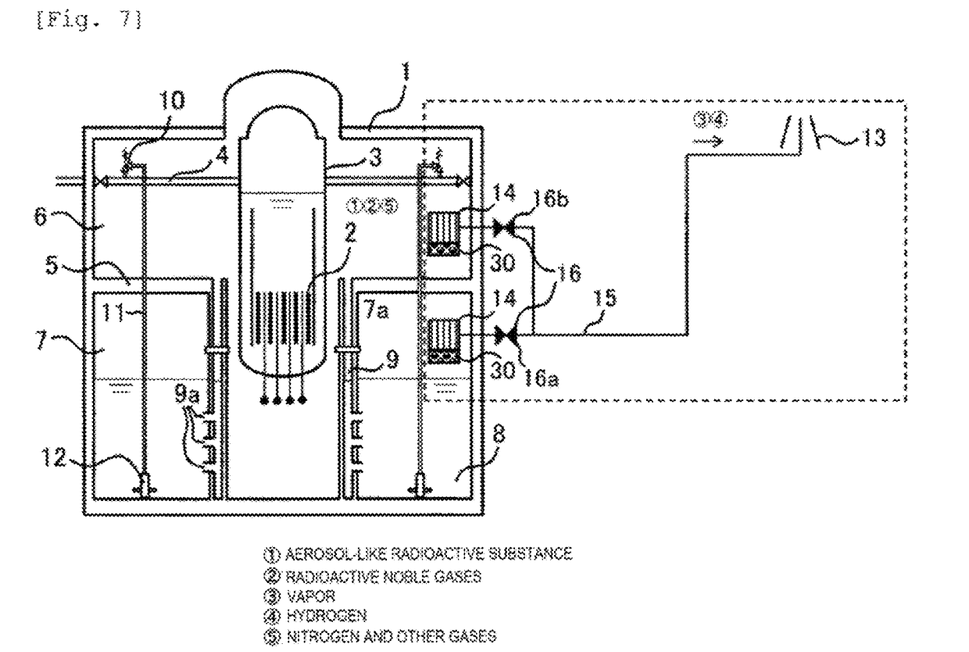
FIG. 7 is a configuration diagram of a primary containment vessel venting system according to a seventh embodiment.

A primary containment vessel venting system according to a sixth embodiment which is one of preferred embodiments to achieve the above object will be described with reference to FIG. 7. FIG. 7 is a longitudinal sectional view showing a schematic configuration of a primary containment vessel that includes a primary containment vessel and a primary containment vessel venting system according to the seventh embodiment. The primary containment vessel venting system according to the seventh embodiment is surrounded in a dashed box in FIG. 7. An arrangement configuration of the radioactive substance separation apparatus 14 in the seventh embodiment is also similar to that in the first embodiment, and only a difference from the first embodiment will be described here.

Although the gas in the primary containment vessel 1 is replaced with nitrogen, there is 3% or less oxygen due to water radiolysis at the time of an accident. A hydrogen recombiner 30 is provided at the inlet portion of the radioactive substance separating apparatus 14 to combine hydrogen and oxygen in the primary containment vessel 1 into water to perform an exothermic reaction. A gas heated by the exothermic reaction passes through an inside of the radioactive substance separation apparatus 14, so that a temperature of the separation membrane 40 can be maintained high. Generally, the higher the temperature of the separation membrane is, the higher a gas diffusion rate is and the higher a separation speed is. With this mechanism, the rate of a gas discharged by the separation membrane can be maintained high, and the pressure of the primary containment vessel 1 can be reduced more quickly. Further, as a secondary effect by heating, a rising air current is generated inside the upstream space 41 of the separation membrane 40, so that impurities such as radioactive noble gases can be prevented from being retained near the separation membrane 40.

The hydrogen recombiner 30 can directly increase the temperature of the separation membrane 40 by heating the gas as described above, and the temperature of the radioactive substance separation apparatus 14 can be increased to heat the separation membrane 40 by disposing the hydrogen recombiner 30 on an outer periphery of the radioactive substance separation apparatus 14. The hydrogen recombiner 30 is a catalyst impregnated with palladium or platinum on a carrier made of mixed oxide such as cerium oxide and zirconium oxide. In addition, a metal oxide catalyst or the like that contains metal such as lithium, sodium, magnesium, calcium, iron, nickel, copper, strontium, silver, or cerium is effective.

Further, in a pressurized water reactor, although an igniter is provided as a countermeasure against hydrogen treatment inside the primary containment vessel 1, reaction heat generated by hydrogen recombination can be used to heat the separation membrane 40 by providing the igniter at the inlet portion or on the outer periphery of the radioactive substance separation apparatus 14.

Eighth Embodiment

Figure 8:
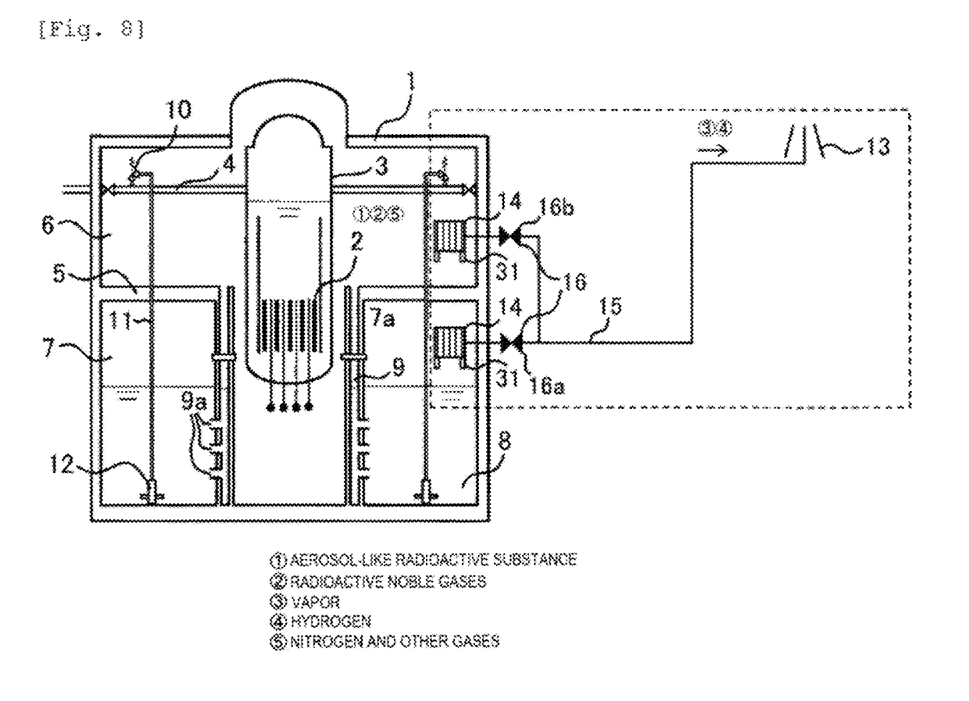
FIG. 8 is a configuration diagram of a primary containment vessel venting system according to an eighth embodiment.

A primary containment vessel venting system according to an eighth embodiment which is one of preferred embodiments to achieve the above object will be described with reference to FIG. 8. FIG. 8 is a longitudinal sectional view showing a schematic configuration of a primary containment vessel that includes a primary containment vessel and a primary containment vessel venting system according to the eighth embodiment. The primary containment vessel venting system according to the eighth embodiment is surrounded in a dashed box in FIG. 8. An arrangement configuration of the radioactive substance separation apparatus 14 according to the eighth embodiment is also similar to that in the first embodiment and only a difference from the first embodiment will be described here.

In the radioactive substance separation apparatus 14, vapor and hydrogen can be selectively separated and discharged to the vent pipe 15. By providing a chimney 31 at the bottom of the outlet of the radioactive substance separation apparatus 14, concentration of vapor and hydrogen is reduced in the upstream space 41 of the radioactive substance separation apparatus 14 and concentration of nitrogen or oxygen which is a main component in the primary containment vessel 1 is increased. A difference in fluid density caused by a concentration increase of nitrogen or oxygen becomes a driving force that generates a descending air current, so that impurities such as the radioactive noble gases can be prevented from being retained near the separation membrane 40.

Ninth Embodiment

Figure 9:
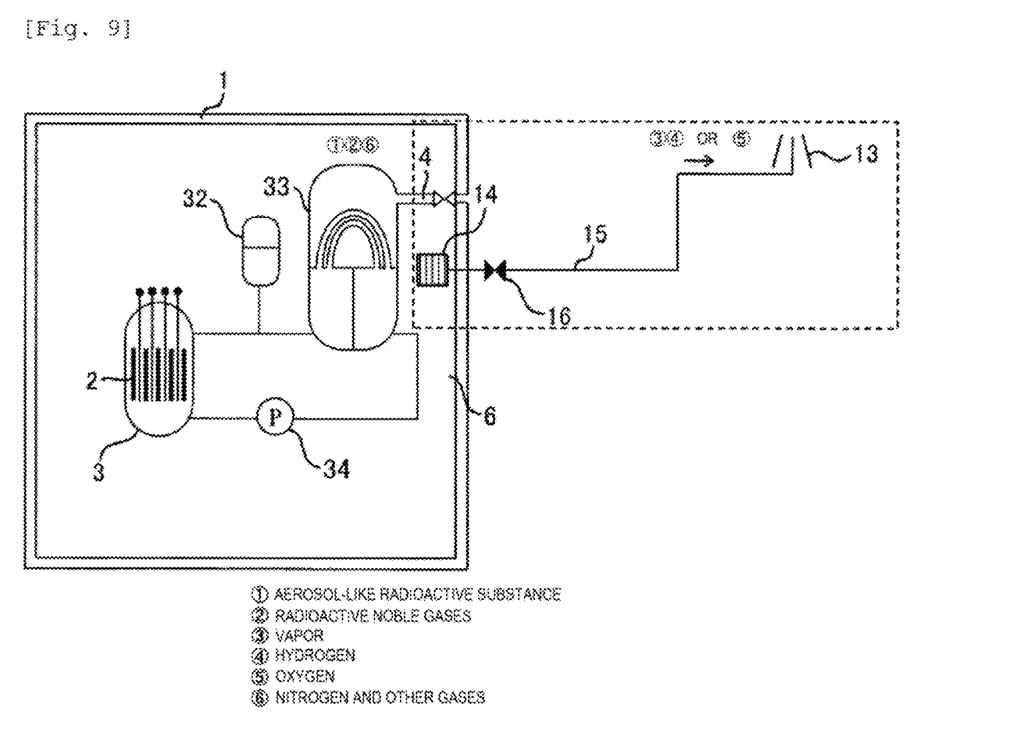
FIG. 9 is a configuration diagram of a primary containment vessel venting system according to a ninth embodiment.

A primary containment vessel venting system according to a ninth embodiment which is one of preferred embodiments to achieve the above object will be described with reference to FIG. 9. FIG. 9 is a longitudinal sectional view showing a schematic configuration of a primary containment vessel that includes a primary containment vessel and a primary containment vessel venting system according to the ninth embodiment. The primary containment vessel venting system according to the ninth embodiment is surrounded in a dashed box in FIG. 9.

The ninth embodiment is an example in which the primary containment vessel filter venting system in the first embodiment is applied to the pressurized water reactor. Cooling water of a primary system is pressurized by a pressurizer 32 in the reactor pressure vessel, circulated by a recirculation pump 34, and transferred to a vapor generator 33 (at a primary side). In the vapor generator 33, heat is exchanged by a heat transfer pipe, heat is transferred from the primary side to a secondary side to generate vapor, and the vapor flows through the main vapor pipe 4.

Since the pressurized water reactor does not include the wet well 7 and the suppression pool 8 for controlling the pressure increase in the primary containment vessel 1, the radioactive substance cannot be expected to be removed by using scrubbing in the suppression pool 8. Therefore, by opening the isolation valve 16 of the dry well 6, the radioactive substance is removed by the radioactive substance separation apparatus 14, and the vapor is discharged to the outside. This embodiment is similar to the first embodiment except that there is no vent from the wet well 7 side. The wet filtered containment venting system 17, the dry filtered containment venting system 17, the rupture disk 27, the particle removal apparatus 28, the iodine removal apparatus 29, the hydrogen recombiner 30, and the chimney 31 as in the second to eighth embodiments may also be used.

Tenth Embodiment

Figure 10:
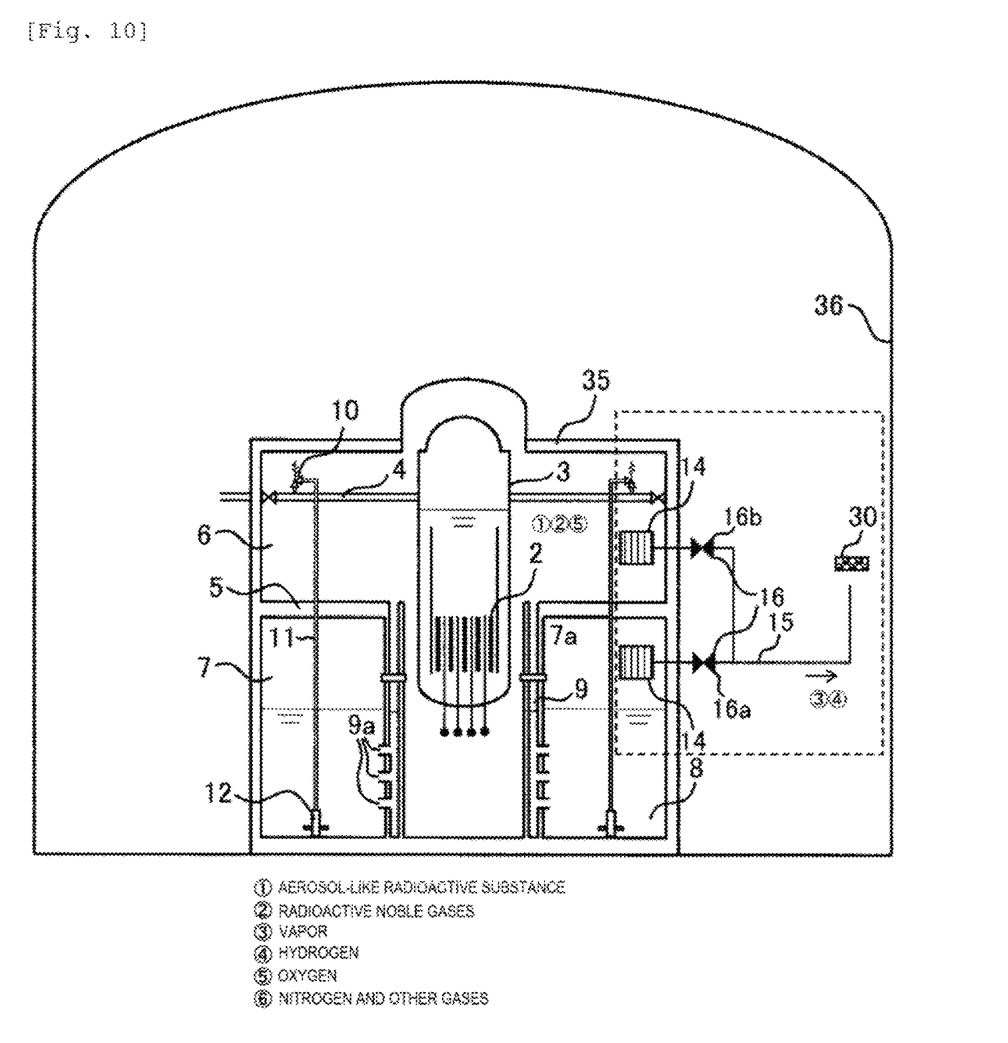
FIG. 10 is a configuration diagram of a primary containment vessel venting system according to a tenth embodiment.

A primary containment vessel venting system according to a tenth embodiment which is one of preferred embodiments to achieve the above object will be described with reference to FIG. 10. FIG. 10 is a longitudinal sectional view showing a schematic configuration of a primary containment vessel that includes a primary containment vessel and a primary containment vessel venting system according to the tenth embodiment. The primary containment vessel venting system according to the tenth embodiment is surrounded in a dashed box in FIG. 10.

A secondary containment vessel 36 that includes a primary containment vessel 35 as a primary containment vessel is provided in the tenth embodiment. The secondary containment vessel 36 is in communication with the dry well 6 and the wet well 7 in the primary containment vessel 35 via the vent pipe 15 and the isolation valve 16. A gas vented from the primary containment vessel 35 flows into the vent pipe 15 via the radioactive substance separation apparatus 14 disposed inside the primary containment vessel 35 and is discharged into the secondary containment vessel 36. The radioactive substance separation apparatus 14 can prevent the radioactive substance from transferring to the secondary containment vessel 36. Further, by discharging the gas into the secondary containment vessel 36 rather than to the outside, the radioactive substances can be confined inside the secondary containment vessel 36 even in a case where the separation membrane 40 inside the radioactive substance separation apparatus 14 is broken and the radioactive substance is discharged through the vent pipe 15. Further, efficient hydrogen treatment can be performed by providing the hydrogen recombiner 30 near the outlet of the vent pipe 15 with high hydrogen concentration. Other configurations are similar to those in the first embodiment. The radioactive substance separation apparatus 14 may be provided inside the secondary containment vessel 36, and the radioactive substance separation apparatus 14 may be provided with the exhaust tower 13 outside the secondary containment vessel 36 via the vent pipe 15. The filtered containment venting system 17 in the second and third embodiments may be provided inside the secondary containment vessel 36, and the outlet pipe 22 may replace the exhaust tower 13 to be in communication with the inside of the secondary containment vessel 36. Further, the filtered containment venting system 17 may be provided outside the secondary containment vessel 36, and the secondary containment vessel 36 may further be a configuration capable of venting to the outside through the filtered containment venting system 17. The particle removal apparatus 28, the iodine removal apparatus 29, and the chimney 31 as in the fifth, sixth and eighth embodiments may also be used. Further, the invention may be applied to a pressurized water reactor or reactors of other types.

REFERENCE SIGN LIST 1 primary containment vessel
2 reactor core
3 reactor pressure vessel
4 main vapor pipe
5 diaphragm floor
6 dry well
7 wet well
7a wet well gas phase unit
8 suppression pool
9 vent pipe
9a discharging portion of the vent pipe
10 vapor safety relief valve
11 vapor safety relief valve exhaust pipe
12 quencher
13 exhaust tower
14 radioactive substance separation apparatus
15 vent pipe
16 isolation valve
16a isolation valve at a wet well side
16b isolation valve at a dry well side
17 filtered containment venting system
18 inlet pipe
19 pool water for scrubbing
20 metal filter
21 iodine filter
22 outlet pipe
23 shield wall
24 sand filter for removing radioactive substance
25 baffle plate
26 bypass pipe
27 rupture disk
28 particle removal apparatus
29 iodine removal apparatus
30 hydrogen recombiner
31 chimney
32 pressurizer
33 vapor generator
34 recirculation pump
35 primary containment vessel
36 secondary containment vessel
40 separation membrane
41 upstream space
42 downstream space
43 closing plate

The invention claimed is:

1. A nuclear power plant, comprising:
   a reactor containment vessel which includes a reactor pressure vessel;
   a radioactive substance separation apparatus which is disposed inside the reactor containment vessel, and through which a radioactive noble gas does not permeate but vapor permeates;
   an exhaust tower which is disposed outside the reactor containment vessel, and which is configured to discharge a gas;
   a vent pipe connecting the reactor containment vessel to the exhaust tower; and
   an isolation valve disposed in the vent pipe;
   wherein, during a venting operation, the isolation valve is opened to discharge the gas from the exhaust tower via the vent pipe, from which the radioactive noble gas has been removed by the radioactive substance separation apparatus.

2. The nuclear power plant according to claim 1, further comprising:
   a wet or dry filtered containment venting system between the radioactive substance separation apparatus and the exhaust tower.

3. The nuclear power plant according to claim 2, further comprising:
   a bypass pipe which is configured to send a gas inside the reactor containment vessel to the filtered containment venting system without passing through the radioactive substance separation apparatus.

4. The nuclear power plant according to claim 3, further comprising:
   a rupture disk which is at an upstream portion of the bypass pipe and is configured to discharge excess pressure when pressure is equal to or higher than predetermined pressure.

5. The nuclear power plant according to claim 1, further comprising:
   a particle removal apparatus at an inlet portion of the radioactive substance separation apparatus.

6. The nuclear power plant according to claim 1, further comprising:
   an iodine removal apparatus at an inlet portion of the radioactive substance separation apparatus.

7. The nuclear power plant according to claim 1, further comprising:
   a hydrogen recombiner at an inlet portion of the radioactive substance separation apparatus.

8. The nuclear power plant according to claim 1, further comprising:
   a chimney at an outlet portion of the radioactive substance separation apparatus.

9. The nuclear power plant according to claim 1,
   wherein the radioactive noble gas and nitrogen does not permeate but hydrogen and vapor permeates through the radioactive substance separation apparatus.

10. The nuclear power plant according to claim 1,
    wherein a separation membrane of the radioactive substance separation apparatus is one of a polymer membrane, a ceramic membrane, and a graphene oxide membrane.

11. The nuclear power plant according to claim 1,
    wherein a separation membrane of the radioactive substance separation apparatus is a polymer membrane with polyimide as a main component.

12. The nuclear power plant according to claim 1,
    wherein a separation membrane of the radioactive substance separation apparatus is a ceramic membrane with silicon nitride as a main component.

13. The nuclear power plant according to claim 1,
    wherein a separation membrane of the radioactive substance separation apparatus is a graphene oxide membrane with carbon as a main component.

14. The nuclear power plant according to claim 1,
    wherein the nuclear power plant is a boiling water reactor which is configured to supply vapor generated in the reactor pressure vessel to a turbine.

15. The nuclear power plant according to claim 1,
    wherein the nuclear power plant is a pressurized water reactor which is configured to supply vapor generated in the reactor pressure vessel to a vapor generator.

16. The nuclear power plant according to claim 1, further comprising:

a separation membrane through which the radioactive noble gas does not permeate but the vapor permeates, wherein an internal space of the radioactive substance separation apparatus is divided by the separation membrane disposed parallel to a flow direction of fluid flowing inside, wherein a part of the internal space of the radioactive substance separation apparatus divided by the separation membrane is closed by a closing plate, wherein a fluid which flows from a bottom of the radioactive substance separation apparatus and does not permeate through the separation membrane is returned from an upper portion of a room which is not closed by the closing plate to the reactor containment vessel, and wherein a fluid which flows from the bottom of the radioactive substance separation apparatus and permeates through the separation membrane flows to the vent pipe via an adjacent room.

17. A nuclear power plant, comprising:
a reactor containment vessel which includes a reactor pressure vessel;
a radioactive substance separation apparatus which is disposed inside the reactor containment vessel, and through which a radioactive noble gas does not permeate but vapor permeates;
an exhaust tower which is configured to discharge a gas from which the radioactive noble gas is removed by the radioactive substance separation apparatus; and
a tubular separation membrane through which the radioactive noble gas does not permeate but the vapor permeates,
wherein an internal space of the radioactive substance separation apparatus is divided by the separation membrane disposed parallel to a flow direction of fluid flowing inside,
wherein a fluid which flows from a bottom of the radioactive substance separation apparatus and does not permeate through the separation membrane is returned from an upper portion of the separation membrane to the reactor containment vessel, and
wherein a fluid which flows from the bottom of the radioactive substance separation apparatus and permeates through the separation membrane flows to a vent pipe.

18. A nuclear power plant, comprising:
a reactor containment vessel which includes a reactor pressure vessel;
a radioactive substance separation apparatus which is disposed inside the reactor containment vessel, and through which a radioactive noble gas does not permeate but vapor permeates;
an exhaust tower which is configured to discharge a gas from which the radioactive noble gas is removed by the radioactive substance separation apparatus; and
a hollow fiber separation membrane through which the radioactive noble gas does not permeate but the vapor permeates,
wherein an internal space of the radioactive substance separation apparatus is divided by the separation membrane disposed perpendicular to a flow direction of fluid flowing inside,
wherein a fluid which flows from a bottom of the radioactive substance separation apparatus and does not permeate through the separation membrane is returned from an upper portion of the separation membrane to the reactor containment vessel, and
wherein a fluid which flows from the bottom of the radioactive substance separation apparatus and permeates through the separation membrane flows to a vent pipe.

* * * * *